(12) United States Patent
Gräber

(10) Patent No.: US 12,007,010 B2
(45) Date of Patent: Jun. 11, 2024

(54) GEAR WHEEL OF A TRANSMISSION

(71) Applicant: ROLLS-ROYCE DEUTSCHLAND LTD & CO KG, Blankenfelde-Mahlow (DE)

(72) Inventor: Michael Gräber, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 117 days.

(21) Appl. No.: 17/859,498

(22) Filed: Jul. 7, 2022

(65) Prior Publication Data

US 2023/0053677 A1 Feb. 23, 2023

(30) Foreign Application Priority Data

Aug. 20, 2021 (DE) ...................... 10 2021 121 659.1

(51) Int. Cl.
*F16H 55/06* (2006.01)
*F02C 7/36* (2006.01)
*F16H 55/17* (2006.01)

(52) U.S. Cl.
CPC .............. *F16H 55/06* (2013.01); *F02C 7/36* (2013.01); *F16H 55/17* (2013.01); *F05D 2220/323* (2013.01); *F05D 2260/4031* (2013.01)

(58) Field of Classification Search
CPC .... F16H 55/06; F16H 55/17; F05D 2220/323; F05D 2260/4031; F02C 7/36
See application file for complete search history.

(56) References Cited

U.S. PATENT DOCUMENTS

| 5,002,439 A * | 3/1991 | Lauder ................... C04B 35/80 407/54 |
| 7,861,411 B2 | 1/2011 | Lunin |
| 2019/0048983 A1 | 2/2019 | Modrzejewski et al. |

FOREIGN PATENT DOCUMENTS

| DE | 102018205006 A1 | 10/2019 |
| EP | 3660355 A1 | 6/2020 |
| WO | 2020109772 A1 | 6/2020 |

OTHER PUBLICATIONS

German Search Report dated Feb. 25, 2022 from counterpart German Patent Application No. 10 2021 121 659.1.

* cited by examiner

*Primary Examiner* — Terence Boes
(74) *Attorney, Agent, or Firm* — SHUTTLEWORTH & INGERSOLL, PLC; Timothy J. Klíma

(57) ABSTRACT

A gear wheel of a transmission, in particular of a transmission of a gas turbine engine is described, which is designed with a groove which extends in the circumferential direction on the outer periphery of a base body of the gear wheel and in which fibers running at least in the circumferential direction are arranged. The fibers surround the base body in the circumferential direction, wherein the fibers at least partially support the operating loads on the gear wheel only on a breakage of the base body.

12 Claims, 4 Drawing Sheets

GEAR WHEEL OF A TRANSMISSION

This application claims priority to German Patent Application DE102021121659.1 filed Aug. 20, 2021, the entirety of which is incorporated by reference herein.

The present disclosure concerns a gear wheel of a transmission, in particular a transmission of a gas turbine engine of an aircraft.

As is known, gear wheels of transmissions rotate in operation and transmit power. The kinetic energy of the rotating gear wheels is a square of the product of the mass of the gear wheel and the rotational speed. In the case of breakage of a gear wheel, fragments of the gear wheel are flung out of the former rotation path along a tangential flight path with varying force depending on the current kinetic energy. The greater the rotation speed of the gear wheel at the time of breakage, and the greater the mass of the fragment, the greater the kinetic energy with which the fragments hit structures surrounding the gear wheel. If the kinetic energy of the fragments exceeds permitted values, the structures are damaged by the impact. It is possible that the fragments of a broken gear wheel will penetrate a wall of a transmission casing and hit further devices, arranged in the periphery surrounding the transmission, with high kinetic energy and possibly damage these.

This is a particular problem in the sector of gas turbine engines such as aircraft engines, which are designed with a transmission in the power train between a turbine and a fan. There is a possibility that ejected fragments of gear wheels may disrupt a function of an aircraft engine, which is undesirable.

In order to avoid an uncontrolled ejection of fragments of a gear wheel following a breakage of a gear wheel, it is possible for example to design a transmission casing with a corresponding strength. However, this procedure increases the overall weight of a transmission, which has a disadvantageous effect on the specific fuel consumption of an aircraft engine.

In addition, it must be considered that a gear wheel breakage may be triggered by a function loss of a bearing of a gear wheel. This means that the probability of a gear wheel breakage may also be dependent on the failure probability of a gear wheel bearing, which under some circumstances may be higher than the probability that a gear wheel breakage will occur without bearing damage. Then it cannot be ensured that the probability of a breakage of a rotating gear wheel is as low as possible.

WO 2020/109 772 A1 discloses a gear wheel which is made at least partially from composite materials. It is proposed inter alia to design a gear wheel with an annular metallic component and with a composite material component. The metallic component comprises a support ring and gear wheel teeth which are formed on the support ring. The support ring has a relatively thin wall and is therefore designed to be relatively flexible. If loads occur in the region of the gear wheel teeth during operation of the gear wheel, undesired deformations or bending of the support ring may also occur. In order to reduce the risk of deformation of the metallic components, composite material reinforcement elements for the composite material component are provided on shoulders of the support ring, and cooperate with the support ring via a press fit. The composite material reinforcement elements exert a radially inwardly directed force on the support ring, which improves the strength and load-bearing capacity of the gear wheel as a whole.

In the case of a gear wheel breakage in the region of the metallic support ring, with the above-described embodiment of the gear wheel, there is a high probability that the crack in the gear wheel may not be restricted solely to the metallic support ring, but that also that the composite material reinforcement elements, which are connected to the metallic support ring via the press fit, may also be damaged and fragments of the gear wheel flung out in the tangential direction during operation.

The present disclosure is based on the object of providing a gear wheel with which, on occurrence of a gear wheel breakage, there is a low probability of damage to components arranged in the vicinity of the gear wheel by fragments of the gear wheel.

This object is achieved with a gear wheel with features as disclosed herein.

A gear wheel of a transmission is proposed, in particular a transmission of a gas turbine engine of an aircraft, with a groove which extends in the circumferential direction in a base body of the gear wheel, on the outer periphery of the base body. Fibers running at least in the circumferential direction are arranged in the groove and surround the base body in the circumferential direction. The fibers at least partially support operating loads acting on the gear wheel only on a breakage of the gear wheel.

The fiber wrapping of the gear wheel according to the present disclosure is thus not permanently or fixedly connected to the gear wheel, but arranged in the groove only so far that, in normal operation of the gear wheel, the winding rotates therewith and remains in the groove but does not support operating loads or contribute to the strength of the gear wheel.

However, broken fragments of the gear wheel which occur in the case of breakage of the so-called gear rim are held together by the fiber wrapping, which is configured with a corresponding elasticity, on the rotation path of the gear wheel for longer operating periods than with known gear wheel designs. This ensures that, on continued rotation of the gear wheel, the fragments are still as often as possible carried by the tooth engagement with at least one further gear wheel, although the tooth engagement has already deteriorated because of the first breakage of the gear wheel.

The already broken gear wheel or the fragments of the gear wheel are then crushed, similarly to in a mill or shredder, into multiple fragments until the size of the individual fragments falls below a defined upper limit. Then the fragments are no longer retained by the fiber wrapping and finally leave the original rotation path of the gear wheel under the action of centrifugal force.

Below the defined upper size limit of the fragments, the fragments each have a component mass which, because of the resulting kinetic energy, cause no significant damage in the region of components which are arranged in the vicinity of the gear wheel and which are impacted by the fragments.

The present disclosure is based on the knowledge that the total sum of the kinetic energy of all fragments of the gear wheel remains the same, but the number of fragments flung out is higher, because of the retention of the initial fragments and the resulting sub-sequent crushing of the fragments, than with known gear wheels. As a result, the total area of the impact sites of the individual fragments of the gear wheel in the static transmission or engine structure is also enlarged. The kinetic energy acting on the impact area is therefore correspondingly lower. Thus the probability of penetration of fragments, e.g. through a transmission casing, is also lower. Accordingly, the probability that a preferably initial gear rim breakage in the region of a transmission of an aircraft engine has effects relevant to flight safety, is also low.

Said advantages are achieved in a structurally simple fashion if there is no fixed connection between the fibers or a fiber composite of the fiber wrapping and the actual gear wheel material, in particular in the circumferential direction of the base body of the gear wheel. Therefore, in the case of a gear wheel breakage or a so-called gear rim breakage, the fibers or fiber composite may deform elastically independently of the gear wheel material, in particular in the circumferential direction of the gear wheel. The breakage or further breakages in the gear wheel material cannot propagate into the fiber wrapping because of the absence of connection to the fibers.

In the present case, a non-fixed connection between the fibers and the actual gear wheel material means an arrangement of the fibers in the circumferential region of the gear wheel such that, in normal operation of the undamaged gear wheel, the fiber wrapping cannot or may not make any contribution to the stiffness or strength of the gear wheel itself.

In addition, it is advantageous that the fiber wrapping can be removed from the gear wheel easily, for example during an inspection of the gear wheel or maintenance of the gear wheel or the transmission in which the gear wheel is installed. Following inspection of the gear wheel, again a new fiber wrapping may easily be arranged on the gear wheel.

The region of the base body or gear wheel rim of the gear wheel in which the at least one groove is provided, may be provided next to a tooth profile of the gear wheel in the axial direction. In such an embodiment of the gear wheel according to the present disclosure, the fibers each lie in a special circumferential groove. This guarantees that the fibers do not interact with the gear wheel teeth which are in engagement with further gear wheel teeth of a further gear wheel meshing therewith. The functionality of the fibers is thus not reduced by a breakage of the gear wheel. In the same way as in a mill or a shredder, a continued tooth engagement between the broken gear wheel and a further gear wheel leads to further damage and further cracks on the damaged gear wheel, and/or similar damage on the gear wheel meshing with the broken gear wheel, which may also be wrapped by fibers.

The further engagement and associated rotation of the broken gear wheel continues the damage to the broken gear wheel, for example in the form of further cracking of the broken gear wheel. Further damage and further cracking of the broken gear wheel leads to a further disintegration of the gear wheel into a larger number of fragments, each of which has a correspondingly smaller mass and a correspondingly lower kinetic energy.

If the fibers are arranged in the groove of the base body such that a separation of the fibers from the gear wheel caused by centrifugal force during a rotational movement of the gear wheel is prevented, the protective function of the fibers against an uncontrolled ejection of fragments of a gear wheel with high kinetic energy is maintained or guaranteed in simple fashion for sufficiently long operating times, and an undesired escape of fragments of a gear wheel from a transmission is avoided.

In order to avoid an undesired separation of fibers from the gear wheel, the fibers may be embodied in a matrix, preferably an epoxy matrix, and/or in an additional layer of a textile or a fabric. Here again, the fibers are arranged in the groove on the gear wheel such that, in normal operation of the transmission, the fibers make no or only a negligible contribution to the capacity of the transmission, and also in particular of the gear wheel, to transmit load or power.

Accordingly, there is no specific connection between the fibers, or the fibers embedded in a matrix, and a base gear wheel material or the material from which the base body is made.

This fulfils the object that, in the case of breakage of the gear wheel base body caused for example by a fault in the gear wheel base body or failure of the transmission bearing, the annular continuity of the fibers initially still remains intact. Here, the breakage or crack in the base body of the gear wheel cannot propagate into the fibers because there is no fixed connection between the fibers and the gear wheel base material.

The so-called annular continuity of the fibers prevents the gear wheel from cracking or unwinding on breakage, and then undesirably large gear wheel fragments being flung along a tangential flight path away from the rotation path of the gear wheel and being released as high-energy wreckage. The annular continuity of the broken gear wheel, maintained by means of the fibers, forces the fragments of the broken gear wheel instead to continue to rotate about the gear wheel axis.

Aramide fibers, silicon carbide fibers and/or carbon fibers may be provided as fibers, all of which constitute high-strength fibers.

In one embodiment of the gear wheel according to the present disclosure, which is distinguished by low installation complexity and in which the fibers can easily be arranged on the gear wheel, the fibers are wound in the groove in the circumferential direction of the gear wheel, similarly to a thread on a reel.

The fibers may be arranged in the groove in the form of strips and/or as a fiber bundle. Then because of the mutual support of the fibers, the fibers as a whole are characterized by a high strength and effectively counter an uncontrolled ejection of large fragments of the gear wheel following a gear wheel breakage, at least until large fragments of the gear wheel, following the first gear wheel breakage, are broken or crushed into smaller fragments to the above-described extent during further operation of the gear wheel.

The winding direction of the fibers is the same as the rotation direction of the gear wheel if the gear wheel is always rotated in the same rotation direction, so that the rotation direction is opposite the unwinding direction of the fibers.

If a length of the fibers is greater than the circumference of the base body of the gear wheel, the circumference of the gear wheel is completely surrounded at least once by the length of a fiber, whereby the fiber wrapping can again absorb high radial loads which occur following a gear wheel breakage.

The gear wheel described in more detail above may for example be a planet gear rotating at high rotation speed during operation of a planetary gear mechanism, or a sun gear or a ring gear.

In the case of a gas turbine engine which is described and claimed herein, a combustion chamber may be provided so as to be axially downstream of the fan and the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages.

Each stage may comprise a row of rotor blades and a row of stator vanes, the latter potentially being variable stator vanes (in that the angle of incidence of said stator vanes can be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade over which gas flows, that is to say the portion that is situated radially outside any platform.

The radius of the fan can be measured between the engine center line and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and claimed herein may be defined as the ratio of the stagnation pressure upstream of the fan to the stagnation pressure at the exit of the highest pressure compressor (before the entry to the combustion chamber). By way of non-limiting example, the overall pressure ratio of a gas turbine engine as described and claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of a gas turbine engine may be defined as the net thrust of the gas turbine engine divided by the total mass flow through the engine. The specific thrust of an engine as described and/or claimed herein at cruise conditions may be less than (or of the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range delimited by two of the values in the previous sentence (that is to say that the values may form upper or lower limits). Such gas turbine engines can be particularly efficient in comparison with conventional gas turbine engines.

A gas turbine engine as described and claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade as described herein can be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described herein may comprise a central portion from which the fan blades can extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any arbitrary suitable method may be used for production of such a blisk or bling. For example, at least some of the fan blades can be machined from a block and/or at least some of the fan blades can be attached to the hub/disk by welding, such as linear friction welding, for example.

The gas turbine engines described here may or may not be provided with a VAN (Variable Area Nozzle). Such a variable area nozzle can allow the exit cross section of the bypass duct to be varied during use. The general principles of the present disclosure can apply to engines with or without a VAN.

The fan of a gas turbine engine described here may have any desired number of fan blades, for example 16, 18, 20 or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or the gas turbine engine at the midpoint (in terms of time and/or distance) between end of climb and start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine described here may be operated under the cruise conditions which are defined elsewhere here. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are furthermore possibilities of combining individual features, including those which emerge from the claims, the following description of embodiments and directly from the drawing. Reference to the drawings by the claims through the use of reference signs is not intended to restrict the scope of protection of the claims.

Preferred refinements are derived from the dependent claims and the description hereunder. Exemplary embodiments of the subject matter according to the present invention are explained in greater detail with reference to the drawing, without being restricted thereto. In the drawing:

Figure 4:
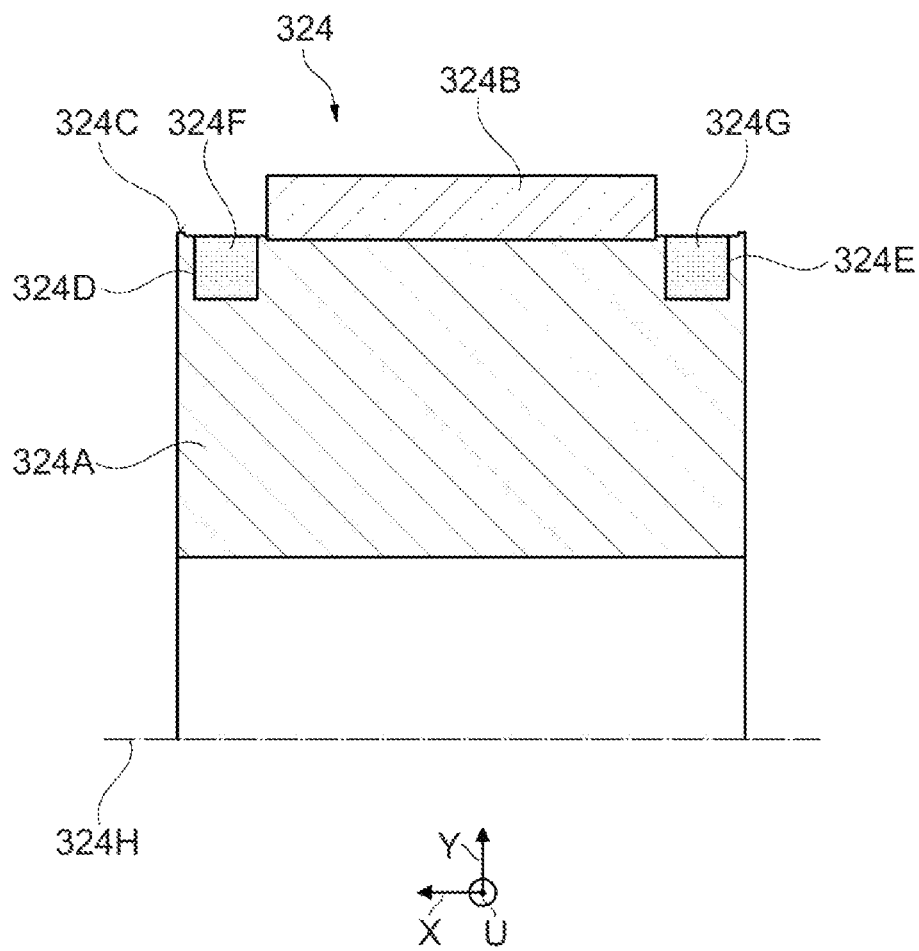
FIG. 4 shows a highly schematic, individual illustration, in a partial longitudinal sectional view, of a first embodiment of a gear wheel configured as a planet gear of the planetary gear mechanism from FIG. 3; said gear wheel having, next to a toothing region in the axial direction, grooves which run in the circumferential direction and in which fibers are arranged.
Figure 5:
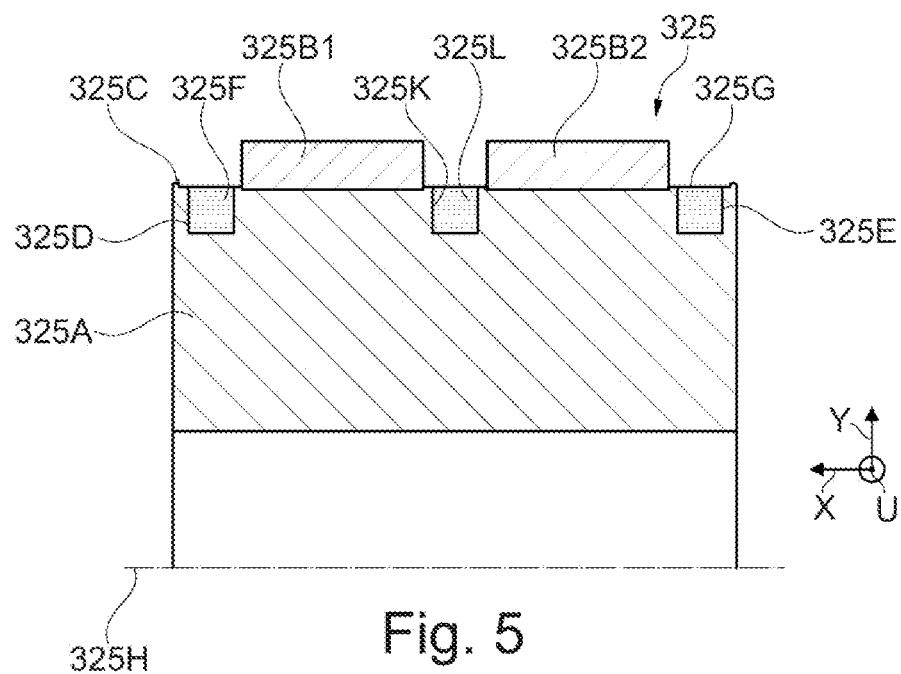
Figure 6:
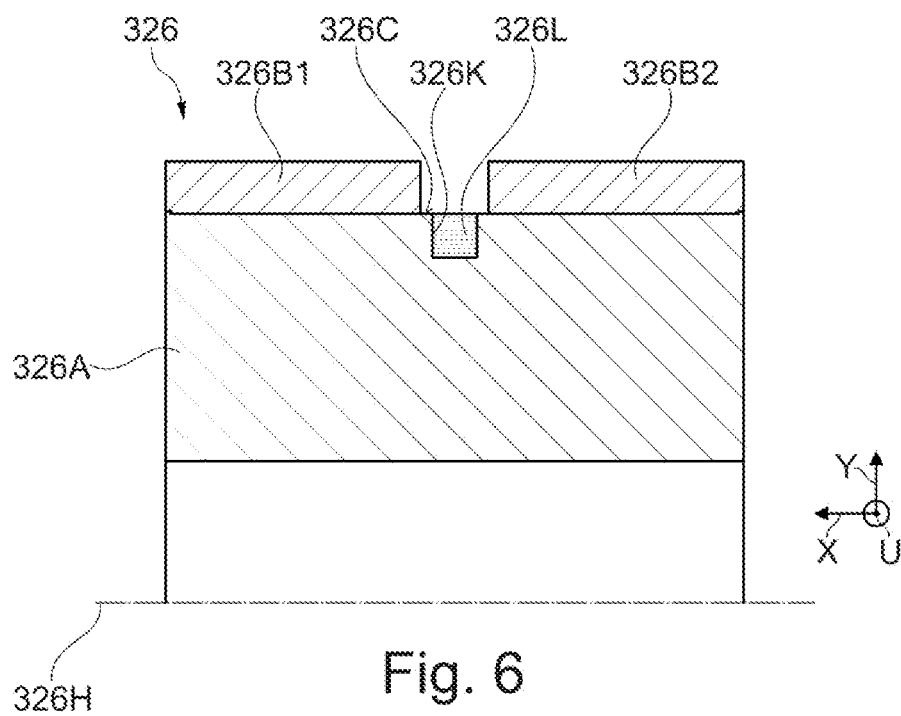

FIG. 5 shows an illustration corresponding to FIG. 4 of a further embodiment of a double-toothed gear wheel configured as a planet gear, wherein a respective groove is provided both between the two toothing regions and also next to the toothing regions in the axial direction X, and has fibers running in the circumferential direction in the groove; and FIG. 6 shows a refinement of the gear wheel shown in FIG. 5, in which a groove is provided which runs in the circumferential direction between two toothing regions and has fibers arranged therein which are wound in the circumferential direction of the planet gear.

Figure 1:
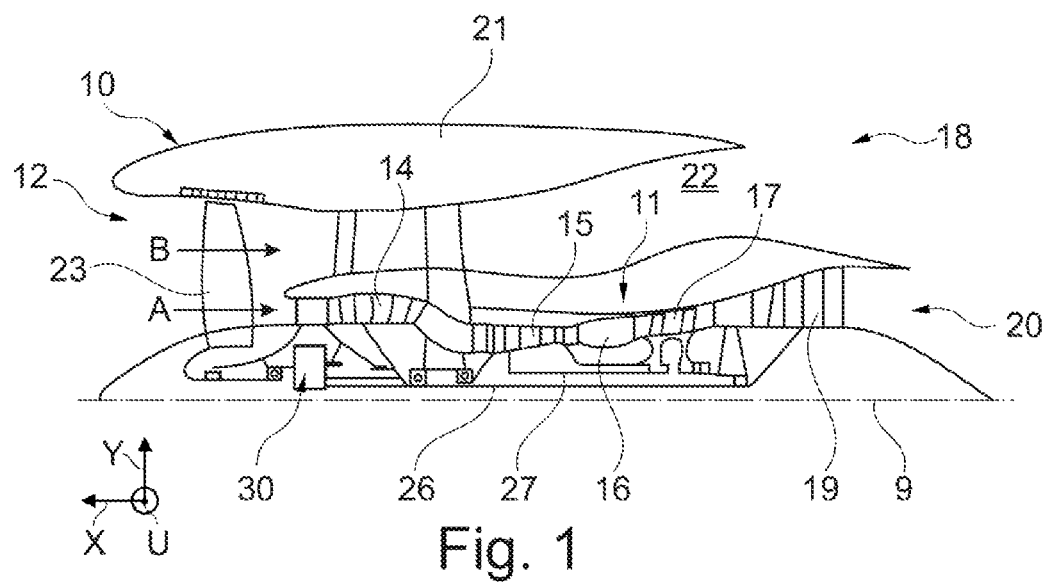
FIG. 1 shows a schematic longitudinal sectional view of a gas turbine engine.

FIG. 1 illustrates a gas turbine engine 10 with a main axis of rotation 9. The engine 10 comprises an air intake 12 and a thrust fan 23 that generates two airflows: a core airflow A and a bypass airflow B. The gas turbine engine 10 comprises a core 11 that receives the core airflow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear mechanism 30. The shaft 26 herein is also referred to as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27, which is also referred to as the core shaft. The fan 23 generally provides the majority of the propulsion force. The epicyclic gear mechanism 30 is a reduction gear mechanism.

Figure 2:
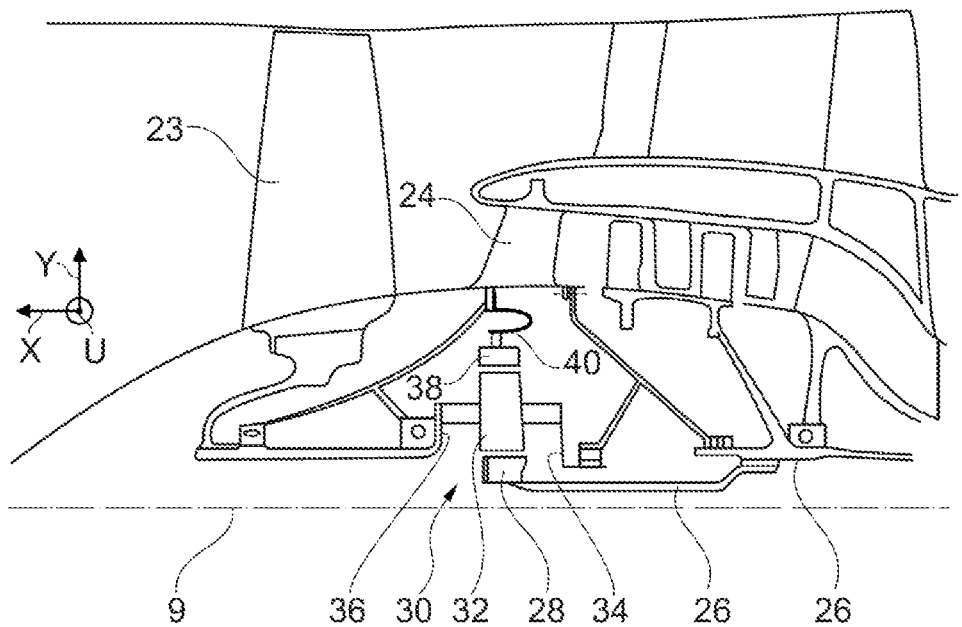
FIG. 2 shows an enlarged, partial, longitudinal sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear arrangement 30. Multiple planet gears 32, which are coupled to one another by means of a planet carrier 34, are situated radially outside the sun gear 28 and mesh with the latter, and are in each case arranged so as to be rotatable on carrier elements or planet pins 42 which are connected in a rotationally fixed manner to the planet carrier 34 and are shown in detail in FIG. 3. The planet carrier 34 limits the planet gears 32 to orbiting around the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
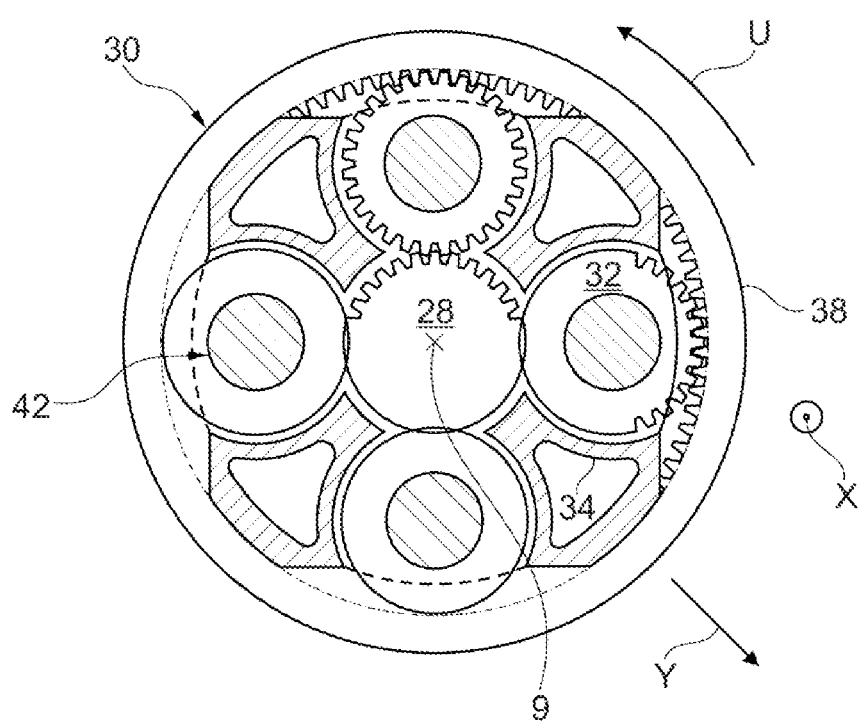
FIG. 3 shows an isolated illustration of a transmission for a gas turbine engine.

The epicyclic gear mechanism 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear mechanism 30 generally comprise at least three planet gears 32.

The epicyclic gear mechanism 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic gear mechanism 30 may be used. As a further example, the epicyclic gear mechanism 30 may be a star arrangement, in which the planet carrier 34 is held fixed, with the ring gear (or annulus) 38 allowed to rotate. In the case of such an arrangement, the fan 23 is driven by the ring gear 38. As a further alternative example, the gear mechanism 30 can be a differential gear in which both the ring gear 38 and the planet carrier 34 are allowed to rotate.

It will be appreciated that the arrangement shown in FIGS. 2 and 3 is merely exemplary, and various alternatives fall within the scope of protection of the present disclosure. Purely as an example, any suitable arrangement may be used for positioning the transmission 30 in the engine 10, and/or for connecting the transmission 30 to the engine 10. By way of a further example, the connections (such as the linkages 36, 40 in the example of FIG. 2) between the transmission 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the transmission and the fixed structures, such as the gear casing) may be used, and the disclosure is not limited to the exemplary arrangement of FIG. 2. For example, where the gear mechanism 30 has a star arrangement (described above), the person skilled in the art would readily understand that the arrangement of output and support linkages and bearing positions would usually be different from those shown by way of example in FIG. 2.

Accordingly, the present disclosure extends to a gas turbine engine having an arbitrary arrangement of transmission types (for example star-shaped or planetary), support structures, input and output shaft arrangement, and bearing positions.

Optionally, the transmission may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of further example, the gas turbine engine shown in FIG. 1 has a split flow nozzle 20, 22, meaning that the flow through the bypass duct 22 has a dedicated nozzle that is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

FIG. 4 shows, in isolation, a partial longitudinal sectional view of a first embodiment of a gear wheel, configured as a planet gear 324 of the planetary gear mechanism 30 shown in FIG. 3. The planet gear 324 comprises a hollow cylindrical base body 324A which with its inner diameter cooperates with an outer diameter of a planet pin, not shown in more detail in FIG. 4, which is rotationally fixedly connected to the planet carrier 34 and the centre longitudinal axis of which is congruent with the rotational axis 324H of the planet gear 324. In the region of its outside 324C, the base body 324A is provided with a toothing region 324B, via which the planet gear 324 is in engagement with the sun gear 28 and the ring gear 38. The toothing region 324B may, depending on the respective application case, have straight or helical gear teeth.

In the axial direction X of the planet gear 324, in the region of an outside 324C of the base body 324A, a groove 324D, 324E is provided on both sides of the toothing region 324B. The grooves 324D, 324E extend over the entire circumference of the base body 324A and are designed open radially towards the outside. Furthermore, the grooves 324D and 324E each have a rectangular cross-section, wherein depending on the respective application, the grooves may also have another suitable cross-sectional form, High-strength fibers 324F, 324G are provided in the grooves 324D and 324E, and are wound in the grooves 324D, 324E in the circumferential direction U of the gear wheel 324 or wound around the base body 324A.

The fibers 324F and 324G in the grooves 324D, 324E are arranged such that, during operation of the planetary gear mechanism 30, the fibers do not support any operating loads which act on the planet gear 324 because of the tooth engagement with the ring gear 38 and the sun gear 28, as long as the planet gear 324 retains its full function scope. The fibers 324F and 324G are also arranged in the grooves 324D, 324E such that during rotation of the planet gear 324, the fibers 324F, 324G remain in the grooves 324F, 324G.

If, during operation of the planetary gear mechanism 30, a breakage occurs in the region of the gear wheel 324 and in particular in the region of the base body 324A, the fibers 324F and 324G prevent, immediately following breakage of the gear wheel 324, a fragment of the planet gear 324 from being guided out of engagement with the sun gear 28 and ring gear 38 tangentially to the circumference of the planet gear 324 by the acting centrifugal force, and being flung against a casing (not shown) of the planetary gear mechanism 30.

After the breakage of the planet gear 324, the fragments of the planet gear 324 are retained by the fiber wrapping or fibers 324F and 324G as long as possible, so that the fragments of the planet gear 324 rotate further about the rotation axis 324H and mesh with the sun gear 28 and ring gear 38. As a result, initially larger fragments of the planet gear 324 are crushed into smaller fragments during the continued tooth engagement with a sun gear 28 and ring gear 38. As soon as the smaller fragments are small enough to no longer be held by the fiber wrapping in the rotation path of the planet gear 324 about the rotational axis 324H, these then leave the rotation path under the action of centrifugal force and then hit an inner wall of the casing of the planetary gear mechanism 30. The impact on the casing of the planetary gear mechanism 30 brakes the ejected fragments of the planet gear 324. Penetration of the fragments through the wall of the casing is avoided because of the low mass of the fragments, whereby the breakage of the planet gear 324 does not lead to damage to further components of the gas turbine engine 10.

FIG. 5 and FIG. 6 show two further embodiments of a gear wheel configured as a planet gear 325 or 326, which also have the function scope of the planet gear 324 described in FIG. 4 and differ only in regions of the planet gear 324. Therefore, in the following description of FIG. 5 and FIG. 6, substantially only the differences between the planet gear 324 and the planet gears 325 and 326 are described in detail. With respect to the fundamental structure and function of the planet gears 325 and 326, reference is made to the above description of FIG. 4.

FIG. 5 shows a second embodiment of a planet gear 325 of the planetary gear mechanism 30 according to FIG. 3, which in contrast to the planet gear 324 has two straight or helical gear toothing regions 325B1, 325B2 in the region of its outside 325C, via which the planet gear 324 is in engagement with the sun gear 28 and the ring gear 38. The planet gear 325 comprises a hollow cylindrical base body 325A which with its inner diameter cooperates with an outer diameter of a planet pin, which is rotationally fixedly connected to the planet carrier 34 and the centre longitudinal axis of which is congruent with the rotational axis 325H of the planet gear 325.

In addition, in the axial direction X of the gear wheel 325, a respective groove 325D, 325E is provided next to the toothing regions 325B1 and 325B2 in the axial direction X, and in which high-strength fibers 325F, 325G wound in the circumferential direction U are again provided. In addition, in the axial direction X of the gear wheel 325, a further groove 325K is produced in the outside 325C of the base body 325A between the two toothing regions 325B1, 325B2, in which groove fibers 325L running in the circumferential direction U are also wound.

FIG. 6 shows a third embodiment of a planet gear 326 which comprises a hollow cylindrical base body 326A which with its inner diameter cooperates with an outer diameter of a planet pin, which is rotationally fixedly connected to the planet carrier 34 and the centre longitudinal axis of which is congruent with the rotational axis 326H of the planet gear 326.

In addition, the planet gear 326, like the planet gear 325, has two straight or helical gear toothing regions 32661, 325B2 on its outside 326C, via which the planet gear 326 is in engagement with the sun gear 28 and the ring gear 38. In contrast to the gear wheel 325, the gear wheel 326 in FIG. 6 has a groove 326K only in the region between the two toothing regions 326B1, 326B2, in which groove fibers 326L are arranged and wound in the circumferential direction U.

Where deemed suitable by the person skilled in the art and depending on the respective application in each case, the above-described structural embodiments of the gear wheels, which are each configured as planet gears, may be provided also for example in other gear wheels of planetary gear mechanisms, such as sun gears or ring gears, and also in general in gear wheels which are operated at high rotational speeds.

LIST OF REFERENCE SIGNS

9 Main axis of rotation
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Transmission, planetary gear mechanism
32 Planet gear
34 Planet carrier
34A, 34B Cheeks
36 Linkage
38 Ring gear
40 Linkage
42 Planet pin
324 Planet gear
324A Base body
324B Toothing region
324C Outside of base body
324D, 324E Groove
324F, 324G Fibers
324H Rotational axis of planet gear 324
325 Planet gear
325A Base body
325B1, 325B2 Toothing region of planet gear 325
325C Outside of base body
325D, 325D, 325E Groove of planet gear 325
325F, 325F, 325G Fibers of planet gear 325
325H Rotational axis of planet gear 325
326 Planet gear
326A Base body
326B Toothing region
326C Outside of base body of planet gear 326
326H Rotational axis of planet gear 3256
326K Groove of planet gear 326
326L Fibers of planet gear 326
A Core air flow
B Bypass air flow
U Circumferential direction
Y Radial direction
X Axial direction

The invention claimed is:

1. A gear wheel of a transmission, comprising:
a base body;
a groove which extends in a circumferential direction on an outer periphery of the base body and in which fibers running at least in a circumferential direction are arranged, surrounding the base body in the circumferential direction;
wherein the fibers provide two operating modes:
in a first mode, in a normal operation of the gear wheel, the fibers do not support operating loads of the gear wheel or contribute to the strength of the gear wheel; and
in only a second mode, upon breakage of the gear wheel, the fibers at least partially support operating loads acting on the gear wheel.

2. The gear wheel according to claim 1, wherein a region of the base body of the gear wheel, in which the at least one groove is provided, is arranged next to a toothing region of the gear wheel in an axial direction.

3. The gear wheel according to claim 1, wherein the fibers are arranged in the groove in the base body such that a separation of the fibers from the gear wheel caused by centrifugal force during a rotational movement of the gear wheel is prevented.

4. The gear wheel according to claim 1, wherein the fibers are embedded in a matrix, and/or in an additional layer of a textile or a fabric.

5. The gear wheel according to claim 1, wherein the fibers are aramide fibers, silicon carbide fibers and/or carbon fibers.

6. The gear wheel according to claim 1, wherein the fibers in the groove are wound in a circumferential direction of the gear wheel.

7. The gear wheel according to claim 1, wherein the fibers are arranged in the groove in the form of strips and/or as a fiber bundle.

8. The gear wheel according to claim 1, wherein a winding direction of the fibers is the same as a rotation direction of the gear wheel if the gear wheel is always operated in the same rotation direction.

9. The gear wheel according to claim 1, wherein a length of the fibers is greater than a circumference of the base body.

10. The gear wheel according to claim 1, wherein the gear wheel is a gear wheel of a transmission of a gas turbine engine of an aircraft.

11. The gear wheel according to claim 4, wherein the matrix is an epoxy matrix.

12. The gear wheel according to claim 1, wherein there is no fixed connection between the fibers and the gear wheel.

* * * * *